(12) United States Patent
Stumer et al.

(10) Patent No.: US 6,947,542 B2
(45) Date of Patent: Sep. 20, 2005

(54) CARRIER IDENTIFICATION CODES (CIC) TRANSPORT

(75) Inventors: Peggy M. Stumer, Boca Raton, FL (US); Georg Mayer, Helsinki (FI)

(73) Assignee: Siemens Communications, Inc., Boca Raton, FL (US)

( * ) Notice: Subject to any disclaimer, the term of this patent is extended or adjusted under 35 U.S.C. 154(b) by 618 days.

(21) Appl. No.: 10/085,317

(22) Filed: Feb. 28, 2002

(65) Prior Publication Data

US 2003/0161462 A1 Aug. 28, 2003

(51) Int. Cl.[7] .............................................. H04M 7/00
(52) U.S. Cl. ................................. 379/221.14; 379/242
(58) Field of Search ........................ 379/207.11, 216.01, 379/220.01, 221.14, 233, 234, 242, 245, 246, 355.05, 355.06, 355.07, 355.08, 901

(56) References Cited

U.S. PATENT DOCUMENTS

| | | | | |
|---|---|---|---|---|
| 5,247,571 A | * | 9/1993 | Kay et al. .............. | 379/221.09 |
| 5,422,941 A | * | 6/1995 | Hasenauer et al. .......... | 379/246 |
| 5,465,295 A | * | 11/1995 | Furman .................. | 379/221.14 |
| 5,539,817 A | * | 7/1996 | Wilkes ........................ | 379/230 |
| 6,147,994 A | * | 11/2000 | Duree et al. ................. | 370/392 |
| 6,233,450 B1 | * | 5/2001 | Seppanen ................ | 455/426.1 |
| 6,332,023 B1 | | 12/2001 | Porter et al. ................. | 379/242 |
| 6,668,050 B1 | * | 12/2003 | Kurdukar ............... | 379/216.01 |
| 6,678,364 B2 | * | 1/2004 | Ruckart ................. | 379/121.02 |

* cited by examiner

Primary Examiner—Bing Q. Bui

(57) ABSTRACT

A private communications network and method of private communications network operation. One or more communications servers each have connected communications devices. From communications devices users enter called party numbers that may include a carrier access code (CAC) and carrier identification code (CIC). The called party number is checked for a CAC and any identified CAC/CIC is parsed from the called party number. The parsed called party number and the CAC/CIC are passed independently of each other over a private network to a public network gateway server. The public network gateway server directs the parsed called party number to a carrier network identified by the CIC, connecting the user to the called party.

20 Claims, 4 Drawing Sheets

FIG. 4

```
Carrier-Identification-Code-Operations
        {iso(1) identified-organization(3) icd-ecma(0012) member-company(2)
        siemens-units(1107) etc(1)}
DEFINITIONS EXPLICIT TAGS ::=
BEGIN
IMPORTS OPERATION,
        FROM Remote-Operation-Notation
        {joint-iso-ccitt(2) remote-operations(4) notation(0)}
```
— 200

```
xyz OBJECT IDENTIFIER ::=
        {iso(1) identified-organization(3) icd-ecma(0012) member-company(2)
        siemens-units(1107) etc(1)}
```

```
--Carrier Identification Code
privCIC   ::= OPERATION
          ARGUMENT CicArg
```
— 202, 204

```
CicArg  ::= SEQUENCE {
                     cic     [0] IMPLICIT CIC OPTIONAL,
                     ...     --Ellipsis
                     }
```
— 204, 208, 210, 206

```
CIC  ::= SEQUENCE {
                   typeOfNwId        TypeOfNwId,
                   nwIdPlan          NwIdPlan,
                   nwIdentification  NwIdentification
                   }
```
— 210

```
--Type of Network Identification
typeOfNwIdMin INTEGER ::=0
typeOfNwIdMax INTEGER ::=7
TypeOfNwId ::= INTEGER {
                       userSpecified(0),
                       nationalNwId(2),
                       internationalNwId(3)
                       } (typeOfNwIdMin..typeOfNwIdMax)
```
— 212, 214, 216, 218, 220

```
--Network Identification Plan
nwIdPlanMin INTEGER ::=0
nwIdPlanMax INTEGER ::=15
NwIdPlan ::= INTEGER {
                     unknown(0),
                     carrierIdentificationCode(1),
                     dataNwIdentificationCode(3)
                     }(nwIdPlanMin..nwIdPlanMax)
```
— 222, 224, 226, 228, 230

```
--Network Identification
nwIdentificationMin INTEGER ::=1
nwIdentificationMax INTEGER ::=32
NwIdentification ::= IA5String (SIZE(nwIdentificationMin..nwIdentificationMax))
```
— 232

```
privCIC    PrivCIC    ::=globalValue {xyz privCIC (nn) }
```
— 234, 236

```
END
```

CARRIER IDENTIFICATION CODES (CIC) TRANSPORT

BACKGROUND OF THE INVENTION

1. Field of the Invention

The present invention is related to a communications network of interconnected servers and more particularly to, routing calls located anywhere in or out of a communications network such as to a public or private network and transporting digit string sequence carrier information.

2. Background Description

Carrier identification codes (CICs) are numeric codes that enable local exchange carriers (LECs) providing interstate interexchange access services to identify the interstate interexchange carrier (IXC) that the originating caller wishes to use to transmit its interstate call. LECs use the CICs to route traffic to the proper IXC and to bill for interstate access service provided. CICs enable callers to choose a telecommunications service provider, both by presubscription and by dialing a carrier access code, or CAC, that incorporates the carrier's unique CIC. Between 1983 and 1998, CICs were unique three-digit codes (XXX) and CACs were five-digit codes incorporating the CIC (10XXX).

However, in 1998, in order to increase the number of CICs available for assignment, four-digit CICs replaced three-digit CICs. With the four-digit CIC, CACs become seven-digit codes. IXCs that had three-digit CICs did not get new codes. Rather, an initial zero was added to their old three-digit CIC (i.e., 0XXX) to make it a four-digit CIC. In addition, a "1" was added to the end of the CAC prefix (i.e., 101 0XXX). Consequently, some carriers advertised the new CAC as a "10 10 XXX" number. Thus, a telephone caller can "dial around" a presubscribed long distance or local toll telephone carrier to reach another carrier by dialing a seven-digit CAC, e.g., in the U.S., (101 XXXX)+1+Area Code+Number.

However, when a private network caller enters a CAC/CIC, the call is routed over the private network to a gateway server to egress to the public network. The CAC/CIC combination is included in the digit string. However, including this seven digit CAC/CIC can cause problems. For example, the additional 7-digit CAC/CIC may cause the digit string to exceed the allowed field length in the server, causing the server to truncate the digit string, mis-routing the call or even resulting in call failure. The public network gateway server may not be able to parse the digits from the string correctly, also causing the call to be mis-routed or call to fail. This string length problem is further exacerbated if the private network requires an egress code (e.g., 9) for egressing to a public network, and worse still, when the number includes international access and country codes.

Also, including CAC/CIC digit values in the routing dial plan digit string patterns increases the number of entries in the routing dial plan exponentially. This increase is proportionate to the number CICs that exist (which has increased tenfold with the change from a three-digit CIC to four digit) and number of digit pattern strings in the customer dial plan. Further, CICs may change very frequently, i.e., due to additions, deletions caused by fluctuating Carrier businesses. These changes require time-consuming and costly dial plan administration.

SUMMARY OF THE INVENTION

It is a purpose of the invention to facilitate the use of carrier identification codes from private network calls;

It is another purpose of the invention to reduce the occurrence of misdirected or failed calls made from a private network using carrier identification codes.

The present invention is a method of operating a private communications network and the private communications network. One or more communications servers each have connected communications devices. A user places a call entering a called party number that may include a carrier access code (CAC) and so, a carrier identification code (CIC). The called party number is checked for a CAC/CIC and any identified CAC/CIC is parsed from the called party number. The parsed called party number and the CIC are passed independently of each other over a private network to a public network gateway server. The public network gateway server directs the parsed called party number to a carrier network identified by the CIC, connecting the user to the called party.

BRIEF DESCRIPTION OF THE DRAWINGS

The foregoing and other objects, aspects and advantages will be better understood from the following detailed description of a preferred embodiment of the invention with reference to the drawings, in which:

FIG. 4 shows an example with the private operation Carrier-Identification-Code defined for the ISO identification in ASN.1 syntax notation.

DESCRIPTION OF PREFERRED EMBODIMENTS

Figure 1:
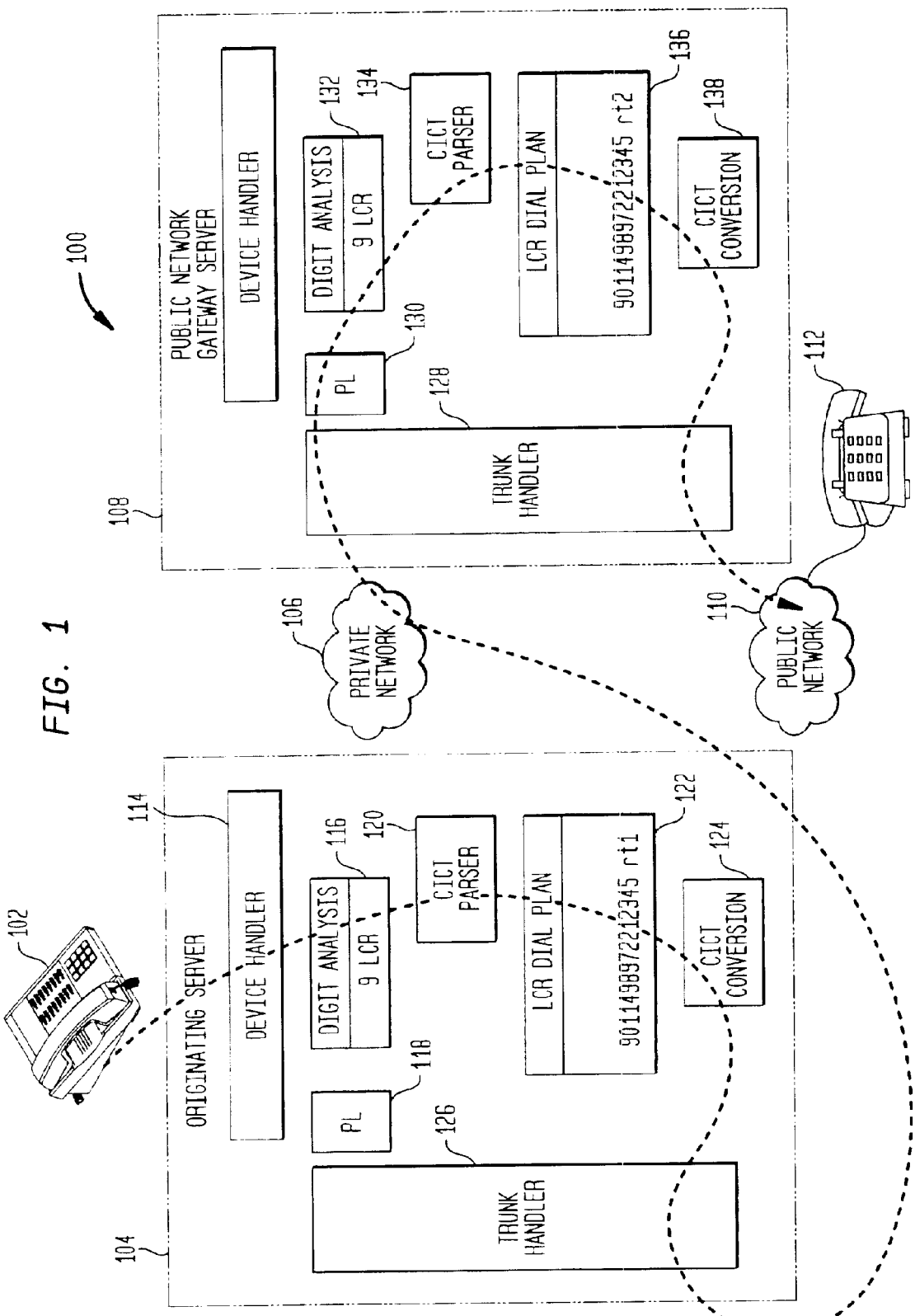
FIG. 1 shows an example of a communications system according to a preferred embodiment of the present invention.

FIG. 1 shows an example of a communications system 100 according to a preferred embodiment of the present invention. In this example, one or more communications devices 102 are connected to a communications server 104. Each communications server 104 is connected to a private network 106 and through the private network 106 to one or more public network gateway server 108. Each public network gateway server 108 is connected to a public network 110, which typically has multiple connected public users 112.

The communications server 104 includes a device handler 114 handling connected communications devices 102. A digit analysis unit 116 receives incoming sequences of digits or digit strings from the device handler 114. A prefix logic unit 118 assists in digit analysis. The digit analysis unit 116 recognizes any digit sequence beginning with "9" as a call to be routed to a least cost routing (LCR). A carrier identification code transport (CICT) parser 120 receives an incoming dialing sequence from the digit analysis unit 116 and extracts the CAC/CIC if included. A least cost routing dial plan unit 122 receives incoming parsed digit strings after the CICT parser 120 removes any CAC/CIC that might have been included. A CICT conversion module 124 receives the parsed dialing sequence from the LCR dial plan 122 and the CIC from the CICT parser 120. The CICT conversion module 124 formats the CIC for the public network gateway server 108. A trunk handler 126 receives the dialing sequence from the CICT conversion module 124 and routes the call through the private network 106 to a trunk handler 128 in the public network gateway server 108. The trunk handler 126 also independently routes the formatted CIC to the public network gateway server 108.

The receiving trunk handler 128 passes the called number digit string to a prefix logic unit 130. The prefix logic unit 130 applies a barrier code (e.g., 9) and passes the received parsed digit string to a digit analysis unit 132 which matches the parsed digit string with its corresponding formatted CIC from the CICT conversion unit 124 in the originating server 104. Since communications devices may also be connected to the public network gateway server 108, a CICT parser 134 there also parses any incoming digit string that includes a CIC. The parsed digit strings are passed to an LCR dial plan 136 in the public network gateway server 108. The parsed digit strings with routing information are passed from this LCR dial plan 136 to a CICT conversion unit 138 that identifies the appropriate format for an outgoing number and call. The CICT conversion unit 138 passes the outgoing number to the trunk handler 128, which routes the number and call to public network 110, making the connection to a called party 112.

In particular, the CAC and CIC are parsed out of the digit string. The CIC is transported over the private network separately. Then, at the gateway server to the public network, the CIC may be mapped to an appropriate ISDN PRI format or parsed back into the digit string (with CAC) for non-ISDN public trunks. The CAC is administered in each server and, therefore may be a different value at each server. Therefore, only the CIC must be transported. It is understood that instead of numeric digits, a logical representation of the CIC (e.g., SPRINT) may be sent and, if necessary, converted by the public network gateway server to the corresponding numeric digit value.

For calls from a private network user, either the calling user or a server within the private network may generate one or more CICs to route the call over a selected carrier network. The outgoing gateway server converts the CIC to signaling elements carrying corresponding information in the carrier network, i.e., Called Party Number (CPN) or Transit Network Selection (TNS) Information Element (IE).

Figure 2:
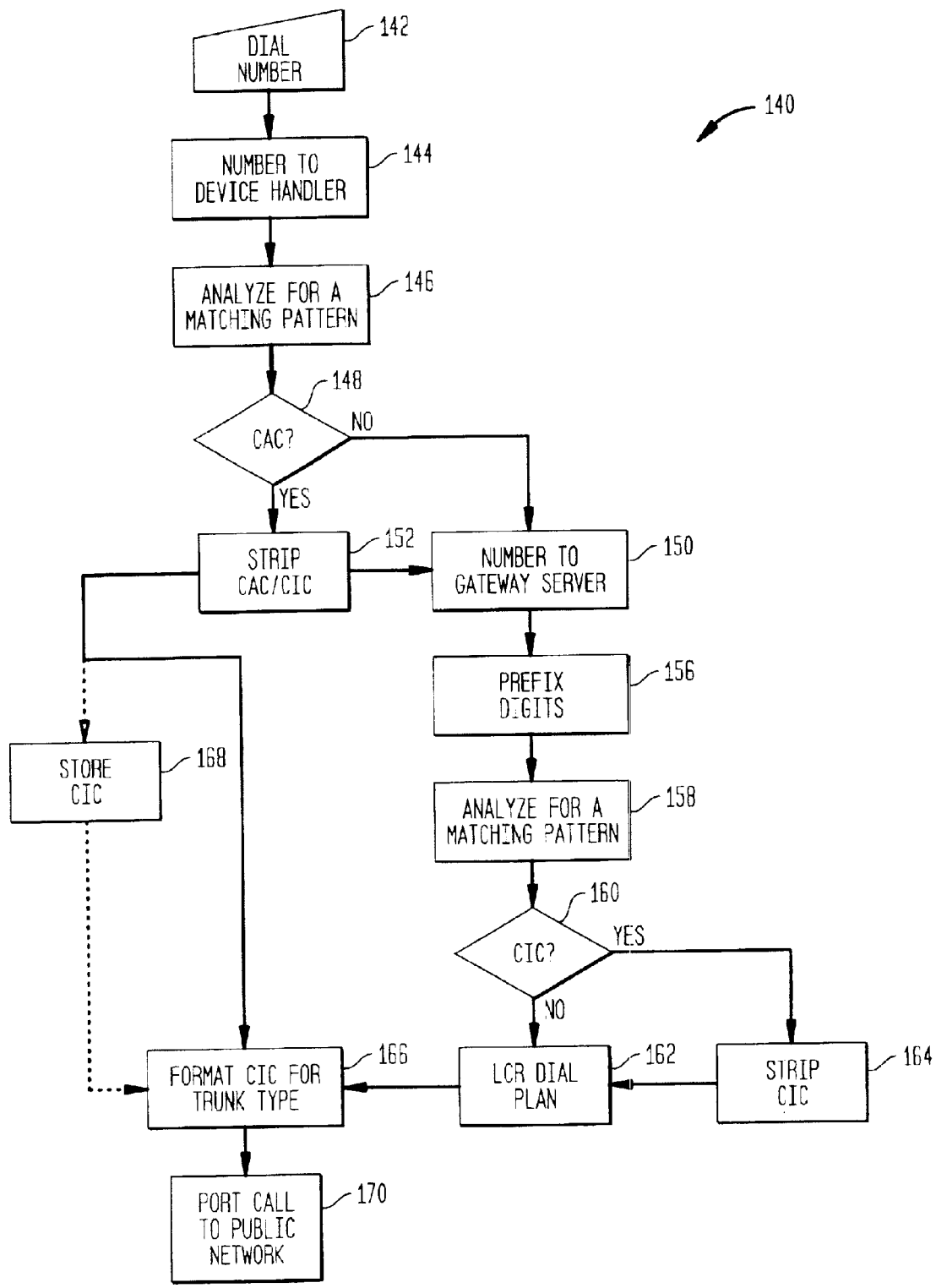
FIG. 2 shows a flow chart with an example of placing calls over the system of FIG. 1.

FIG. 2 shows a flow chart 140 of an example of a method of placing calls over the system 100 of FIG. 1. Whenever a user dials a number in 142, the number is passed to the device handler in step 144. The device handler analyzes the number for a matching CIC pattern in step 146. In step 148 if the number does not contain a CIC pattern, it is passed to the public network gateway server in step 150. If however, the number includes a CIC, then in step 152 the CIC is stripped from the number and formatted for the public network gateway server by the CICT parser. The CICT parser passes the number without the CIC to the trunk handler in 150 and routes the formatted CIC to the public network gateway server. In step 156, the prefix logic prefixes the digit string with any appropriate LCR access code (e.g., 9) and, if appropriate, an international barrier code (e.g., 011). In step 158 the number with its prefix is passed to digit analysis and analyzed for a matching pattern. In step 160, if the number does not include a CIC, either because it was stripped in the originating server or because it was not included when originally dialed, then in step 162 the number is passed to the LCR dial plan unit. Otherwise, in step 164, the CIC is stripped from the number and, the number (without the CIC) is passed to the LCR dial plan in step 162. In step 164 both the number and the CIC are passed individually from the LCR dial plan to the CICT conversion-unit. Based on the corresponding CIC, provided either by the originating server or by the LCR dial plan in step 162, the CIC is formatted for the particular public network trunk type in step 166. Optionally, the CIC may be sent from the originating server for temporary storage on the gateway server in step 168. In step 170 the number is passed over a public network to complete the call to the called party.

So, when a caller places a call in a private network, e.g., from unit 102 in FIG. 1, the call is routed (e.g., for far-end hop-off) to the public network 110. If the caller uses a specific CIC, a separate transport mechanism is used to pass the CIC over the private network 106 to the gateway server 108. The called number is sent to the gateway server 108, simultaneously, where the CIC and called number are re-paired and the call is routed to the public network 110.

The outgoing gateway generates Calling Services information for outgoing calls. The Calling Services information is signaled in the Network Specific Facilities (NSF) IE to/from the Carrier Network. The outgoing gateway server informs the calling user about the generated Calling Services.

So, for example in an international call and where the caller enters a CAC/CIC, the connection progresses though the originating server (104 in FIG. 1) over the private network 106 to a public network gateway server 108, which converts the CIC appropriately for an outgoing trunk to the connected public network 110 as provided in FIG. 2. Thus, in step 142 an international call is made from a device 102 by a user entering a sequence of numbers, e.g., digit string 9011101xxxx498972212345, where, starting from the left-most digit:

9 is the routing function (LCR), 011 is the international barrier code for dialing from the U.S., 101xxxx is the CAC/CIC selected by the user, 49 is the selected country code, 89 is the selected area/city code, 722 is the selected office code, 12345 is the extension number of the called party.

The dialed number sequence is sent into the device handler 114 in step 144. A device handler 114 is a well known a server major complex. The dialed sequence is passed to digit analysis 116 which collects and analyzes each digit until it identifies a matching digit pattern in step 146. In this example, the first digit, 9, is matched and in response all digits are sent to the LCR function of the digit analysis unit 116. The CICT parser module 120 parses the CAC before LCR is applied if the CIC is detected in step 148. The CICT parser 120 scans the digit string digit by digit for a digit match on the value of the CAC prefix (101 in the U.S.). Preferably, the CAC prefix is an administered value that may be different for each country. In the digit string of this example the CICT Parser 120 recognizes the $5^{th}$, $6^{th}$ and $7^{th}$ digits as indicating the CAC presence in step 148. Then, in step 152 the next 4 digits (i.e., CIC digits) are stored in a CIC field. Next, in step 150 the parsed string, i.e., with all digits except the extracted CAC/CIC digits, is passed to LCR dial plan 122 for normal processing. In this example, the digit string matches the single digit pattern depicted in the LCR dial plan 122 in FIG. 1 and is assigned route 1. Preferably, the CICT conversion module 124 is integrated into trunk selection logic of the trunk handler 126. The trunk handler 126 sends the CIC digits in the correct format for the particular designated outgoing trunk. For example, an IP or ISDN private network trunk may be selected/seized with the CIC being sent separate from the called party digit string in the signaling channel of an IP or ISDN trunk, such as in an ISDN Private integrated services Signaling System No. 1 (PSS1 also known as QSIG) trunk. Here, the CIC value is sent as a private operation in a Facility IE in the SETUP message. In this example, an outdial rule would send the Called Party Number IE as Numbering Plan ID (NPI)=ISDN or PNP, Type of Number (TON)=International, and the digit string=498972212345.

The trunk handler 126 of the originating server 104 routes the call and call signaling over the private network 106 to the incoming trunk handler 128 of the public network gateway server 108. In step 156 prefix logic 130 adds prefixes for the administered LCR access code (i.e., 9 in this example) to the digit string. The prefix logic 130 also prefixes the international barrier code (i.e., 011 in the US) to the digit string and sends the prefixed digit string to digit analysis 132. In step 158, the digit analysis unit 132 analyzes the digit string until it finds a matching digit pattern. In this example, the first digit (9) matches indicating an out of network call and so, all digits of the sequence are sent to the LCR function of the digit analysis unit 132. The CICT parser module 134, essentially identical to CICT parser 120, parses the digit string before entering LCR to first extract any detected CAC/CIC in step 158. The CICT parser module 134, again, scans the digit string digit by digit for a digit match with the CAC prefix value which, as before, is an administered value that may be different for each country. However, for the network originated call of this example, in step 160, the CAC is not found in the digit string (and, therefore, neither is the CIC) because the CIC was sent outside of the parsed digit string, e.g., in a QSIG private operation. So, in step 162 the parsed digits are sent to LCR Dial Plan 136. As noted above, the CIC may be stored in step 168 in the gateway server 108 or just transmitted transparently by tandem servers over the signaling channel. The parsed digit string matches the single digit pattern of this example, as depicted in LCR Dial Plan 136 as assigned route 2. During the trunk selection of step 166 the trunk is selected/seized. The CICT Conversion module 138 formats the CIC for the appropriate type of public network trunk, i.e., ISDN or non-ISDN. For an ISDN PRI trunk in step 170 the CIC is sent in proper PRI format in the TNS IE or NSF IE. For a non-ISDN public trunk in step 170, the CIC is sent in channel with the called party number digit string.

Figure 3:
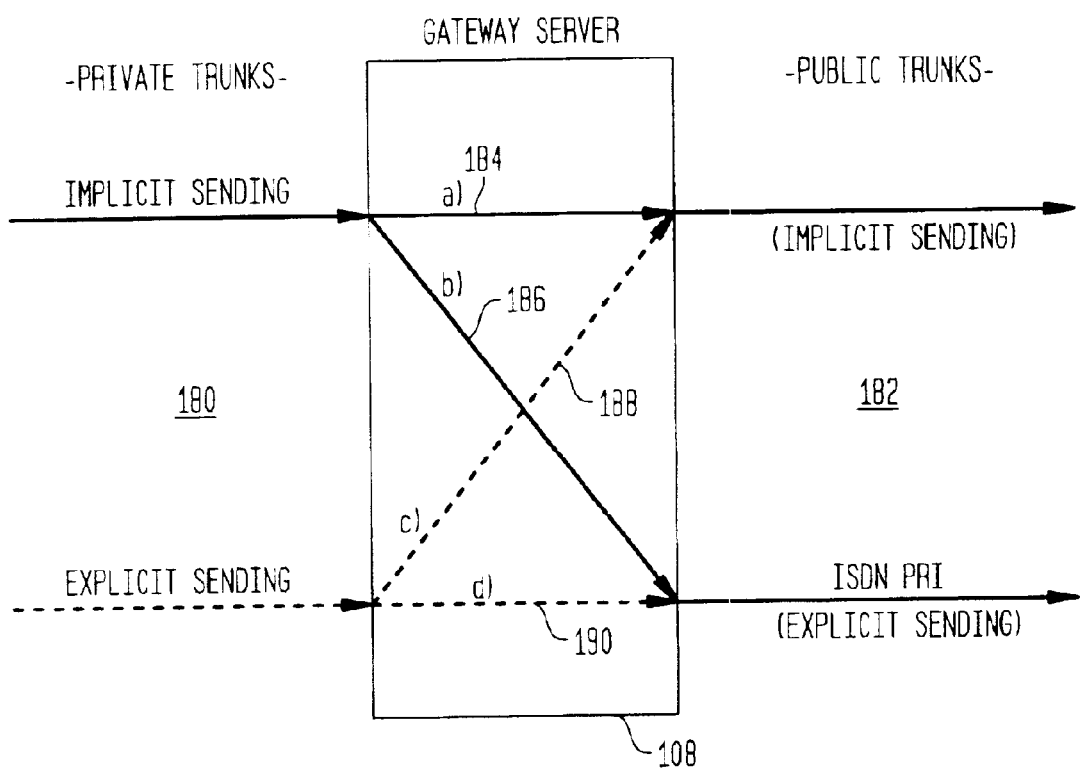
FIG. 3 shows how a Public Network Gateway server sends and receives calls according to the present invention.

FIG. 3 shows how the Public Network Gateway Server 108 may receive private network calls and send calls over the public network where private trunks are represented on the left side 180 and public trunks are on the right side 182. The CIC is sent over the private network 106 according to an administrative option. Thus, the CIC may be included in the digit string or in a private operation/facility. However, it is possible to send the CIC over analog private trunks as a digit string sequence. "Implicit" sending means the CAC/CIC is included in the digit string sequence of the called party number. "Explicit" sending means the CIC is sent separately, i.e., not included within called party number digit string sequence. The function of converting (or not) is part of the CICT Conversion module logic. This function of CICT Conversion is applicable at a tandem/intermediate server in the private network. For example, an incoming private analog trunk with the CAC/CIC sent implicit, could be transmitted on the outgoing trunk over the public network as explicit, or, vise versa. Detailed requirements for the use and encoding of the NSF IE and TNS IE for ISDN PRI are carrier specific and described by the carrier in an applicable PRI switch vendor specification.

Four possible conversions/interworking 184, 186, 188, 190 are possible. Path 184 is an example, where an implicit call is placed on the private network to a Non-ISDN or to ISDN PRI public network line configured for implicit numbering. The LCR access code is parsed and discarded. Then, either the number is outpulsed for non-ISDN or a remaining digit string generated by the LCR out dial rule is placed as the Calling Party Number (CPN) IE (for ISDN PRI).

Path 186 is an example where an implicit call is placed on the private network to a ISDN PRI line configured for explicit numbering. The LCR access code is parsed and discarded. The CAC access code/prefix digits are passed and discarded. The Network Identification Plan is encoded as the CIC in a TNS IE or NSF IE. The 4-digit carrier value is parsed and, the call is passed to Network Identification. Finally, the call is encoded with the remainder of NSF IE and TNS IE encoding.

Path 188 is an example where an explicit call is placed on the private network to a Non-ISDN or to ISDN PRI line configured for implicit numbering. When the Network Identification Plan includes the Carrier Identification Code, the prefix (101) is located, thereby identifying the 4-digit value for the Network Identification field. The 7 digit value is prefixed to the CPN digit string before outpulsing (for non-ISDN) or before passing the CPN IE (for ISDN PRI).

Path 190, is an example where an explicit call is placed on the private network to an ISDN PRI line configured for explicit numbering. When the Network Identification Plan includes the Carrier Identification Code, the Network Identification plan is encoded as the CIC in a TNS or NSF IE. The Network Identification value is placed in the same field of the IE being built. Then, the TNS IE is encoded for private network.

FIG. 4 shows an example with the private operation Carrier-Identification-Code 200 defined for the ISO identification in ASN.1 syntax notation. ASN.1 is a formal notation standard for describing data transmitted by telecommunications protocols, regardless of language implementation and physical representation of these data, whatever the application, whether complex or very simple. In this example, the operation is sent in a Facility IE in the SETUP message in the private network. An operation privCIC 202 is defined with argument or description CicArg 204. CicArg 204 is defined with provision for future enhancement as indicated by a sequence with ellipsis 206. The first element (and only defined element) of the sequence is cic 208, which is optional to send. This element, cic 208, is further described by CIC 210 which contains a sequence of identifiers that represent the categories of information that must be sent whenever privCIC 202 is sent. A Type of Network Identification 212 (i.e., TypeOfNwId 214) is an integer, representing up to eight different values in this example. Of these eight, three values have been defined: userSpecified 216, nationalNwId 218 and internationalNwId 220. Network Identification Plan 222 (i.e., NwIdPlan 224) is an integer representing up to sixteen different values in this example. Of these sixteen values, three have been defined: unknown 226, carrierIdentificationCode 228, or dataNwIdentificationCode 230. The unknown value 226 is used when it is not known whether the 4-digit sequence is a CIC or data carrier ID. A Network Identification 232 (i.e., NwIdentification 234) is an IA5string 236, up to thirty-one digits in this example, containing the digits of the particular selected CIC. Although current CICs are only 4-digit numbers, this may again increase as happened in 1998.

Advantageously, since the CIC is sent independent of the digit string sequence, the server can handle any sized CIC and any corresponding number of CAC/CIC values without being forced to increase the dial plan table size, slow processing or increase administration. Accordingly, the present invention does not require that the server's routing dial plan be changed. The present invention ensures accurate and fast call processing, without impact to the routing dialing plan of any servers in the network.

Further, the present invention has application to a wide variety of different networks. The present invention may be employed in any state of the art communications server for improved voice and data services over public networks, private networks and between public and private networks. Essentially, the present invention has application to any state of the art communications network operating in accordance with well-known standards such as International Standards Organization (ISO), European Computer Manufacturers Association for Standardizing Information and Communication Services (ECMA), European Telecommunications Standards Institute (ETSI), Integrated Services Digital Network (ISDN) signaling, "Q" reference point (QSIG) compliant ISDN, computer supported telephony applications/computer telephony interface (CSTA/CTI) network via applications programming interfaces (API), signaling over Internet Protocol (IP), and Asynchronous Transfer Mode (ATM) networks.

While the invention has been described in terms of preferred embodiments, those skilled in the art will recognize that the invention can be practiced with modification within the spirit and scope of the appended claims.

What is claimed is:

1. A private communications network comprising:
   at least one communications server, said at least one communications server being an originating server with a plurality of connected communications devices, calls being placed from ones of said connected communications devices by entering a called party number, said called party number being provided to said originating server, said originating server parsing any identified carrier identification code (CIC) from said called party number, parsed called party numbers having said CIC parsed therefrom, said originating server placing any parsed said CIC and said parsed called party numbers on a private network of connected servers; and
   at least one connected server being a public network gateway server receiving said parsed called party number from said network and receiving said parsed CIC independent of receipt of said parsed called party number, said public network gateway server passing said parsed called party number to an appropriate carrier network, whereby a user entering a number at one said communications device is connected to a called party over said carrier network.

2. A private communications network as in claim 1 wherein said originating server comprises:
   a device handler interfacing connected communications devices with said originating server;
   a CIC parser stripping carrier access codes (CACs) from said called party numbers to produce said parsed called party numbers and stripping each said CIC from said CACs;
   a CIC conversion unit transporting said stripped CICs over said private communications network to said public network gateway server; and
   a trunk handler interfacing said originating server with said private network.

3. A private communications network as in claim 2, said originating server further comprising:
   a digit analysis unit analyzing incoming called party numbers from connected said communications devices and identifying CICs in said incoming called party numbers; and
   a least cost routing dial plan receiving said parsed called party numbers and assigning routes to received said parsed called party numbers.

4. A private communications network as in claim 3 wherein said originating server further comprises:
   a least cost routing unit identifying whether each of said called party numbers is an out-of-network number.

5. A private communications network as in claim 1 wherein the public network gateway server comprises:
   trunk handler interfacing said private network and said public network with said public network gateway server; and
   a CIC conversion unit converting any CIC received from said public network to a CIC usable on said public network.

6. A private communications network as in claim 5 wherein the public network gateway server further comprises:
   a device handler interfacing said public network gateway server with a second plurality of connected communications devices; and
   a CIC parser parsing CICs from incoming called party numbers from said device handler, parsed called party numbers including any said incoming called party number having said CIC parsed therefrom in said public network gateway server.

7. A private communications network as in claim 6 wherein said public network gateway server further comprises:
   a digit analysis unit identifying called party numbers including a CIC, identified said called party numbers being parsed by said CIC parser; and
   a least cost routing dial plan containing parsed called party numbers and assigning routes to said parsed called party numbers.

8. A private communications network as in claim 7 wherein said public network gateway server further comprises a prefix logic unit assigning prefixes to selected ones of said called party numbers and said parsed called party numbers.

9. A private communications network as in claim 5 wherein the CIC conversion unit formats CICs for an appropriate public network trunk type.

10. A private communications network as in claim 9 wherein the public network trunk type is ISDN.

11. A private communications network as in claim 9 wherein the public network trunk type is analog.

12. A method of operating a private communications network, said method comprising the steps of:
   a) receiving a called party number from a connected private network user;
   b) analyzing said called party number for a carrier identification code (CIC);
   c) parsing any identified CIC from said incoming called party number to form a parsed called party number;
   d) passing called numbers to a public network gateway server, said called numbers including incoming called party numbers and parsed called party numbers;
   e) routing said identified CIC to said public network gateway server;
   f) formatting said routed CIC for a public network trunk type; and
   g) placing said call over a public network.

13. A method as in claim 12 wherein said called party number is analyzed in step (b) for a carrier access code (CAC), CICs being included in CACs.

14. A method as in claim 13 wherein step (c) of parsing any identified CIC comprises:
   i) stripping an identified CAC from said called party number; and
   ii) discarding a CAC prefix from said CAC.

15. A method as in claim 12 wherein said identified CIC is routed to said public network gateway server in step (e) substantially coincident with passing a corresponding parsed called party number in step (d), said CIC being routed to said public network gateway server in a signaling channel.

16. A method as in claim 15 wherein said identified CIC is sent in a QSIG trunk.

17. A method as in claim 12 wherein said private network user is connected to said public network gateway server.

18. A method as in claim 12 wherein said private network user is connected to a communications server remotely located and connected over said private communications network to said public network gateway server.

19. A method as in claim 12 wherein when a CIC is not found in step (b) and said called party number is a long distance call, a CIC is provided and formatted for said public network trunk type.

20. A method as in claim 12 wherein said formatted CIC is sent in a called party digit string sequence.

* * * * *